Figure 1:
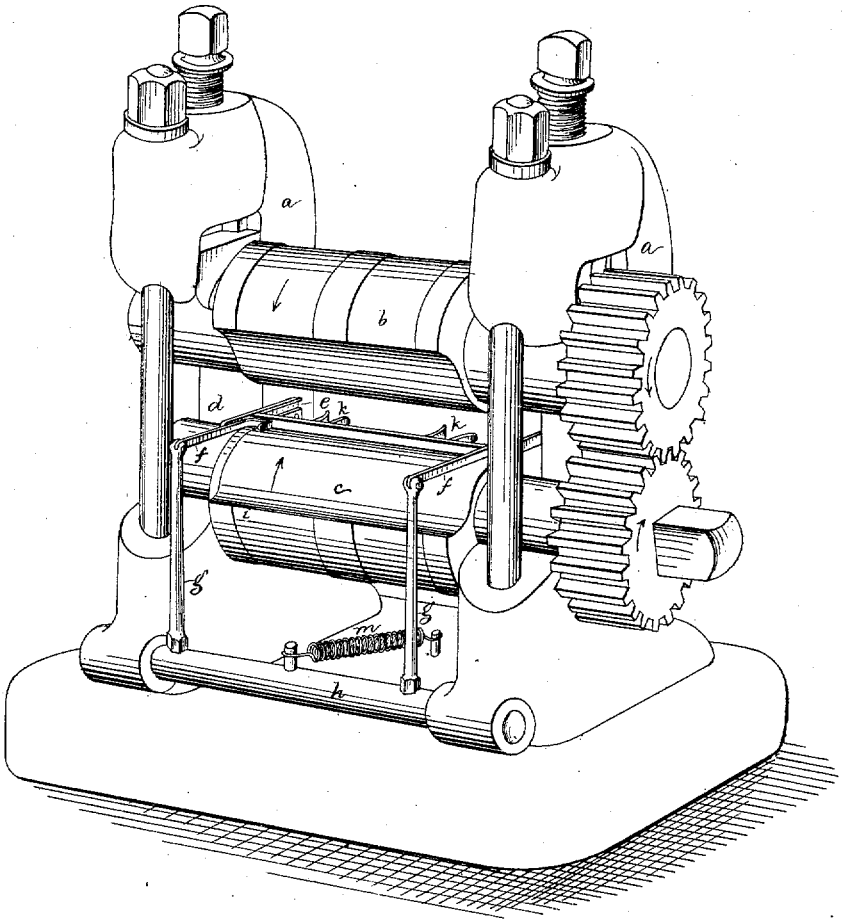

3 Sheets—Sheet 1.

H. WATERS.

MACHINES FOR ROLLING METALS.

No. 7,119. Reissued May 16, 1876.

Witnesses:

E. H. Latimer,

W. J. Pratt.

Inventor

Harvey Waters per Crosby & Gregory atty's.

THE NORRIS PETERS CO., PHOTO-LITHO., WASHINGTON, D. C.

3 Sheets—Sheet 2.

H. WATERS.

MACHINES FOR ROLLING METALS.

No. 7,119.

Reissued May 16, 1876.

*Witnesses:*

L. H. Latimer.

W. J. Pratt.

*Inventor:*

Harvey Waters per Crosby & Gregory attys.

THE NORRIS PETERS CO., PHOTO-LITHO., WASHINGTON, D. C.

3 Sheets—Sheet 3.

H. WATERS.

MACHINES FOR ROLLING METALS.

No. 7,119. Reissued May 16, 1876.

*Witnesses:*

L. H. Latimer,

H. J. Pratt,

*Inventor:*

Hervey Waters per Crosby Gregory

Att'ys.

THE NORRIS PETERS CO., PHOTO-LITHO., WASHINGTON, D. C.

UNITED STATES PATENT OFFICE.

HERVEY WATERS, OF BOSTON, MASSACHUSETTS.

IMPROVEMENT IN MACHINES FOR ROLLING METALS.

Specification forming part of Letters Patent No. 114,735, dated May 9, 1871; reissue No. 7,119, dated May 16, 1876; application filed December 21, 1875.

*To all whom it may concern:*

Be it known that I, HERVEY WATERS, of Boston, in the county of Suffolk and State of Massachusetts, have invented an Improvement in Machines for Rolling Metal; and I do hereby declare that the following, taken in connection with the drawing which accompanies and forms part of this specification, is a description of my invention sufficient to enable those skilled in the art to practice it.

The invention relates particularly to a means of guiding and holding a bar or blank to be rolled in position to be seized by the working grooves or surfaces of a pair of shouldered die-rolls—the bar or blank, supported by the guide, being thrust through between the parts of the rolls which are lower than the working-surfaces, and there held (resting on the guide) by the operator in position for the action of the rolls.

In an application filed concurrently with the filing of the application on which Patent No. 114,735 is based, and which was subsequently patented and numbered 115,000, I described a roller-die for rolling knife-blades, the said roller-die having two die-grooves—one for rolling the blade portions of two knives, the material for the backs of the two blades being at the center of the blank, and the other die was to roll the handle-plates attached to the end of such knife-blades. The dies in the rolls shown in the Patent No. 114,735 are of a shape corresponding with the shape of the dies in the other patent referred to.

The invention consists in the employment, in combination with a pair of die-rolls, of a movable gage-bar and a guide or guides for receiving a projection from the blank or tongs, to position the blank laterally with reference to the die-grooves, suitable stops being arranged so that the gage-bar is arrested when pushed between the rolls, to bring the bar into proper position to be struck by a shoulder upon one of the rolls, so that the dies always act upon the blank with reference to the position of the projection upon the tongs relatively to the surface to be shaped; also, in a shouldered roller-die for rolling knife-blades, provided with an eccentric die or groove, shaped transversely substantially as described, to roll two blades side by side and back to back from the chorl to and over the point, substantially as described; also, in a shouldered roller-die, grooved transversely and eccentrically, substantially as described, to roll two knife-blades back to back, in combination with a shouldered roller-die, grooved as set forth, to roll the handle-plates from the chorl to and over the point, the two dies being constructed and adapted by their joint operation to roll knife-blades, substantially as set forth; also, in the manufacture of knives, the process of rolling the blank for two blades back to back, operating from the chorl-forming portions outward, to form both the blade and handle-plate portions, from a point intermediate between its ends toward its ends. I employ for such purpose a shouldered roller-die, having an eccentric die-groove, with its central face lower than its side edges, and a die-groove adapted to form the handle-plate. The dies bite upon the blank at a point having definite relation to the part of the blank grasped by the tongs or holder, thus insuring uniform action of the rolls upon the blanks.

Figure 2:
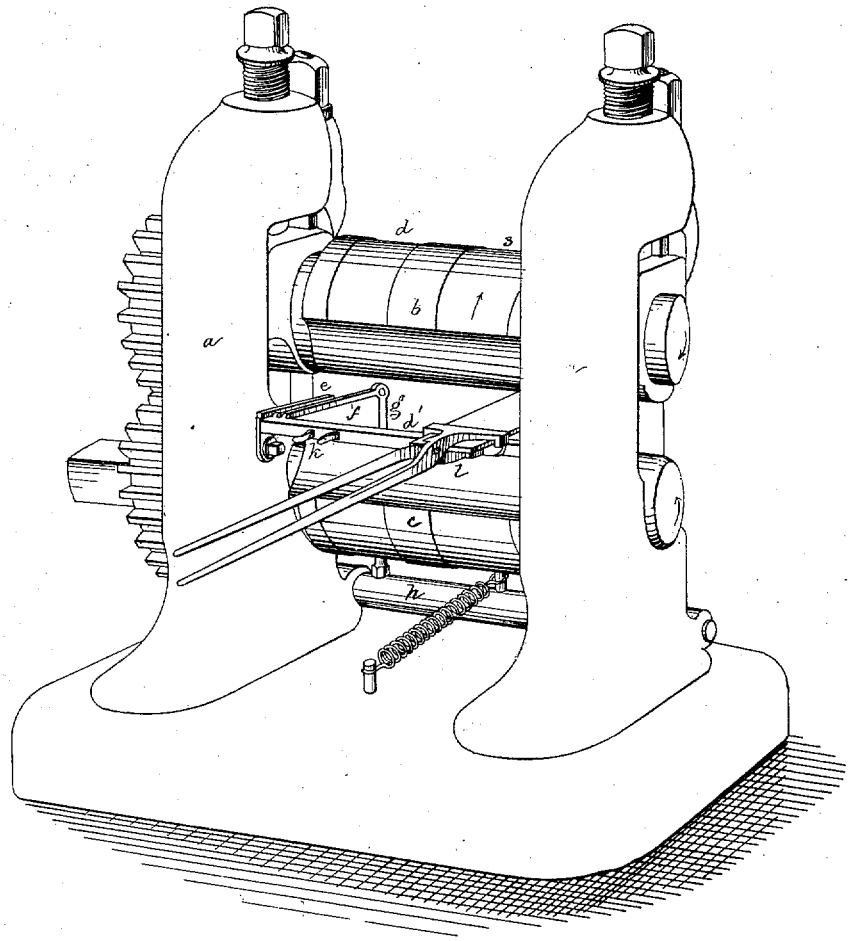
Figure 3:
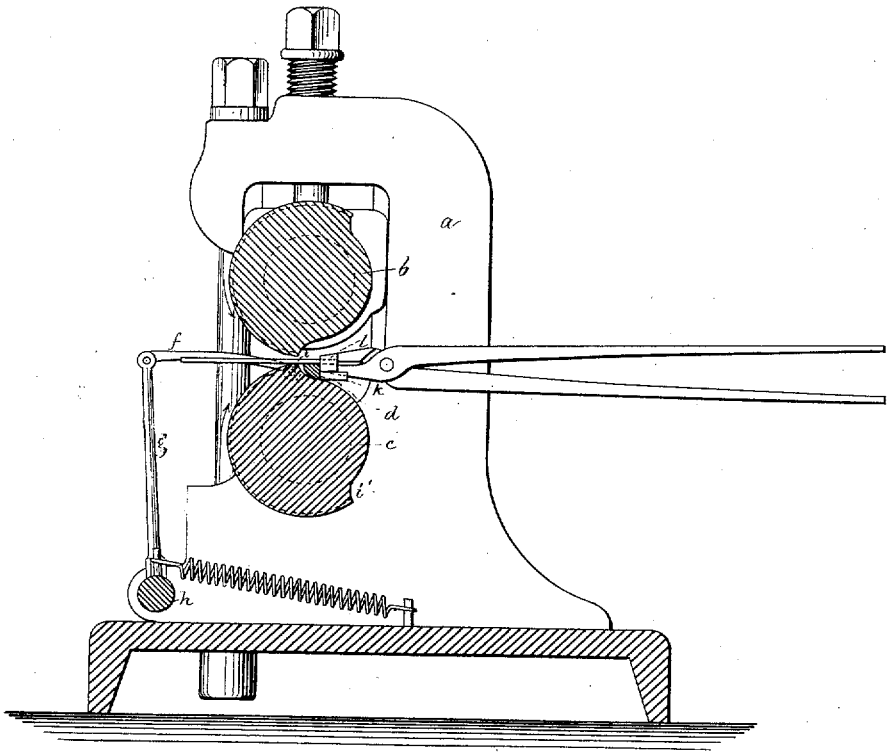
Figure 4:
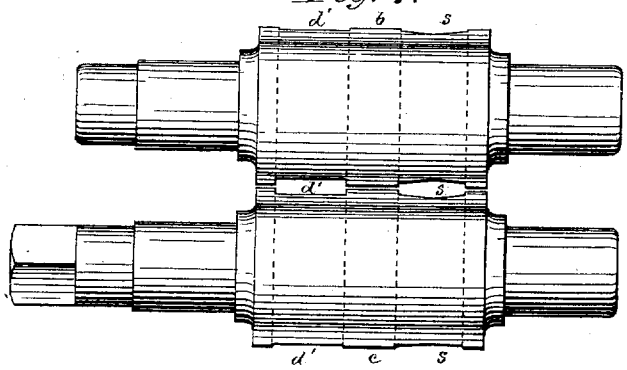
Figure 5:
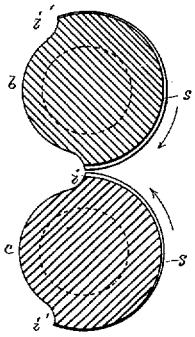

The drawing represents a rolling-machine embodying my improvements. Figures 1 and 2 show perspective elevations of the same. Fig. 3 is a sectional elevation. Fig. 4 represents the roller-dies in side elevation, showing the shape of the die-grooves in the rollers represented in the other figures; and Fig. 5 is a cross section, taken through the bottom of the grooves in such rollers.

*a a* denote the stands or housings, in which are journaled the two rolls *b c*, having parts of their surfaces lower than their working-surfaces, and having in their working-surfaces the die-grooves which impart the desired shape to the bar or blank to be rolled. *d* is a gage-bar, extending across the machine from stand to stand, and parallel to the axes of the rolls, and sliding in stationary grooves or ways *e e*. This gage-bar is connected by links *f* to the upper ends of rocker-arms *g*, extending from a rocker-shaft, *h*. The gage is normally held in front of the rolls, or upon the side where the operator stands, by a spring, *m*, or weight, and it occupies such position, with relation to the lower roll, that when slid between the depressed surfaces of the rolls it will be struck by the shoulder *i* of the lower roll as the rolls rotate, and will be carried toward the operator. Upon this gage-bar, in vertical plane with each die-groove, is a guide or projection, *k*, for positioning the bar or blank laterally with respect to the die-groove.

The blank, grasped in suitable tongs, is laid upon the gage-bar, with a projection from the blank, or a projection, *l*, from the tongs, between the guides *k*, said projection being against the gage-bar. The operator then pushes the blank and gage between the open depressed parts of the rolls until the gage is arrested by suitable stops on the guideways, and the bar will then be in position for the action of the rolls, which grasp the bar or blank between the ends and move it outward. As the rolls turn they do not immediately bite upon the blank, but the shoulder *i* strikes the gage and moves it back, so that the dies bite upon the blank at a point having definite relation to the part of the blank grasped by the tongs, thus insuring uniform action of the rolls upon the blanks.

In Fig. 3 the long end of the blank or bar projecting from the tongs is shown as entering between the rollers *b c* opposite the die-grooves *s*. (See Fig. 4.) The tongs should be in such position on the bar as to have the shoulders or chorl end of the dies strike the blank at such distance from the end of the bar which is between the tongs as to leave between the chorl and the end of the blank enough metal to make the handle-plates. This blank is inserted between the rollers while in the position shown in Figs. 1 and 2, the gage-bar and tongs moving forward until the gage-bar is arrested in its forward movement by suitable stops, which bring the bar in position to be acted upon near the tongs by the die-grooves *s*, (see Figs. 3 and 4,) and such die-grooves act from that point outward.

The end of the bar held during this operation is then inserted (a pair of tongs being applied to the other end of the blank) between the die-grooves *d'*, which roll the end of the bar not acted upon by the grooves *s* into suitable shape for the handle-plates, the positions of the tongs on the blank being such as to permit the dies *d'* to act from the chorl toward the end of the handle-plate.

The mechanism herein shown is specially designed to roll blanks for knife-blades, and a blank for four blades may be rolled at one operation by doubling the blank, as in my Patent No. 47,589; or a blank for two knives may be rolled, the die-grooves *s* being of a depth at their centers to correspond with the thickness it is desired to give to the back of the blade.

I am aware that one patent heretofore issued describes that blanks for two knife-blades may be rolled edge to edge at one operation; but in such machine it is quite impractical to guide and keep the blank straight and prevent it from turning laterally, which results in the production of uneven and crooked work, and in which event there is great tendency of the backs to crack or break; and in such a machine, when the blank once gets out of a direct line, the tendency of the rollers is to increase the evil rather than correct it; but when the die-grooves are deepest at the center, as in the roller-dies herein described, there is no such tendency. I am also aware that another patent describes that blanks for two knife-blades may be rolled back to back by means of plain but not shouldered roller-dies, and such rollers act from end to end of the blank continuously, making it very difficult to form the chorl at a proper and uniform position with relation to the length of the blanks. I am also aware of English Patent No. 2,013, July 12, 1862, and claim nothing therein shown or described, as such patent differs essentially from the machine and process herein described for producing knife-blades.

I claim—

1. A movable gage-bar and guides to position the blank, in combination with shaping die-rolls, adapted to operate substantially as described.

2. A shouldered roller-die for rolling knife-blades, having an eccentric groove, shaped transversely substantially as described, to roll two blades side by side and back to back, from the chorl to and over the point, substantially as described.

3. A shouldered roller-die, having an eccentric groove, shaped transversely substantially as described, to roll two knife-blades back to back, in combination with a shouldered roller-die, adapted to roll the handle-plates from the chorl to and over the point, the two dies being constructed and adapted by their joint operation to roll knife-blades, substantially as set forth.

4. In the manufacture of knives, the described process of holding and gaging the blank with reference to the die-shoulders, and rolling the blank outward from the chorl-forming portion, defined and regulated by the tongs, to form both the blade and handle-plate portions for two knife-blades back to back, all substantially as described.

HERVEY WATERS.

Witnesses:
G. W. GREGORY,
S. B. KIDDER.